United States Patent [19]

Suzuki et al.

[11] Patent Number: 5,119,417
[45] Date of Patent: Jun. 2, 1992

[54] AUTO-DIALING APPARATUS

[75] Inventors: Satomi Suzuki, Tokyo; Hisao Kumai, Tokorozawa, both of Japan

[73] Assignee: Casio Computer Co., Ltd., Tokyo, Japan

[21] Appl. No.: 662,318

[22] Filed: Feb. 22, 1991

Related U.S. Application Data

[63] Continuation of Ser. No. 380,214, Jul. 13, 1989, abandoned.

[30] Foreign Application Priority Data

| Jul. 20, 1988 | [JP] | Japan | 63-95891[U] |
| Oct. 21, 1988 | [JP] | Japan | 63-136753[U] |
| Oct. 21, 1988 | [JP] | Japan | 63-137467[U] |
| Nov. 2, 1988 | [JP] | Japan | 63-142673[U] |
| Nov. 7, 1988 | [JP] | Japan | 63-145238[U] |
| Nov. 7, 1988 | [JP] | Japan | 63-145239[U] |
| Dec. 23, 1988 | [JP] | Japan | 63-165803[U] |

[51] Int. Cl.⁵ .................................. H04M 1/27
[52] U.S. Cl. .................................. 379/354; 379/355
[58] Field of Search ............... 379/354, 355, 356, 357, 379/216; 368/10

[56] References Cited

U.S. PATENT DOCUMENTS

| 4,087,638 | 5/1978 | Hayes et al. | |
| 4,117,542 | 9/1978 | Klausner et al. | |
| 4,130,738 | 12/1978 | Sandstedt | |
| 4,419,770 | 12/1983 | Yagi et al. | 368/10 X |
| 4,563,548 | 1/1986 | Misherghi et al. | |
| 4,709,387 | 11/1987 | Masuda | 379/354 |
| 4,720,855 | 1/1988 | Ohnishi et al. | 379/354 |
| 4,731,811 | 3/1988 | Dubus | 379/58 |
| 4,759,056 | 7/1988 | Akiyama | 379/197 |
| 4,763,355 | 8/1988 | Cox | 379/355 |
| 4,769,836 | 9/1988 | Aihara | |
| 4,800,582 | 1/1989 | D'Agosto, III et al. | 379/216 |
| 4,885,580 | 12/1989 | Noto et al. | 379/354 X |
| 4,891,776 | 1/1990 | Kuroki et al. | 368/10 X |

FOREIGN PATENT DOCUMENTS

| 0075120 | 3/1983 | European Pat. Off. |
| 0205020 | 12/1986 | European Pat. Off. |
| 0206391 | 12/1986 | European Pat. Off. |
| 2156560 | 3/1985 | United Kingdom |

OTHER PUBLICATIONS

Sharp Dial Mate (EL6250), Sharper Image, Jun. 1987, p. 38.
102s Microprocessors and Computers, Course Notes from the Learning Tree, Integrated Computer Systems, 1978, pp. MM3-15 to MM3-28.
Patent Abstract of Japan, vol. 11, No. 190 (E-517) [2637], Jun. 18, 1987, Subscriber Number Memory Device.

*Primary Examiner*—James L. Dwyer
*Attorney, Agent, or Firm*—Frishauf, Holtz, Goodman & Woodward

[57] ABSTRACT

A RAM stores a plurality of alphabet data, and corresponding numerical value data such as national numbers of international telephone numbers and trunk codes. A RAM stores name data, the alphabet data, and telephone number numerical value data. When a switch is operated, the numerical value data are read out in the order that the corresponding national number and trunk code in the RAM are inserted in the alphabet portion in the RAM, the readout data are converted to dialing tones, and the dialing tones are output.

12 Claims, 14 Drawing Sheets

| DISPLAY REGISTER DR | | | | | |
|---|---|---|---|---|---|
| TIMEPIECE REGISTER TR | | | | | |
| M | P1 | P2 | | P3 | N |
| a | AOKI | b | 03 | 456 | 125 |
| 3  a | NAKANO | b | 0425 | | 33 |
| 6432 | | a | MAC | | |

PC

| PASS CODE | a | AIHARA | b | 02 | 21 |
|---|---|---|---|---|---|
| 5 | 3311 | a | ICHIKAWAA | | S |
| UGURU | | b | 0562 | | 43 |

| a | TELEWAY | b | 0070-P-22 | |
|---|---|---|---|---|
| -U-PPPP-0425-55-72 | | | | |
| 72-1234 | | a | DDI | b | 007 |
| -P- | | | | | |

Sections (right side): NORMAL DATA STORAGE SECTION ND; SECRET DATA STORAGE SECTION SD; REGULAR CALL DATA STORAGE SECTION CD

FIG. 8

AUTO-DIALING APPARATUS

This application is a continuation of U.S. application Ser. No. 07/380,214, filed Jul. 13, 1989, now abandoned.

BACKGROUND OF THE INVENTION

1. Field of the Invention

The present invention relates to an auto-dialing apparatus which stores telephone number data in a memory, reads out the telephone number data when a switching operation or the like is performed, converts the readout telephone number data into a dialing tone signal, and outputs the dialing tone signal.

2. Description of the Related Art

Conventionally, apparatuses for converting a telephone number into a dialing tone and outputting the dialing tone are known, and are described in, e.g., U.S. Pat. Nos. 4,087,638 and 4,563,548. An auto-dialing apparatus is also known. In this apparatus, a plurality of names and telephone numbers are stored in a RAM memory, and when one of the plurality of names is selected, a telephone number corresponding to the selected name is read out from the RAM memory and converted to a dialing tone signal and tones corresponding to the dialing tone signal are produced. Thus, a telephone call can be made without depressing push buttons of a telephone set. This apparatus is disclosed in, e.g., U.S. Pat. Nos. 4,117,542 and 4,769,836.

When a telephone call is to be made using an apparatus of this type, names and telephone numbers in the RAM memory are sequentially displayed on a display unit. An operator brings a speaker of the apparatus into contact with a handset and causes the speaker to output dialing tones while a desired name and telephone number are displayed. With the apparatus of this type, since dialing tones must be sent through a handset, if the apparatus is bulky, the dialing operation is very cumbersome. Since the apparatus of this type is often meant for an outdoor use, it must be made compact to improve portability.

The number of digits of a domestic (Japanese) telephone number is a maximum of about 10, and that of an international telephone number is about 12. In an international telephone number, the number of division data for dividing a subscriber's number and a trunk code, or the like is five. In order to store and display an international telephone number including such division data, a storage unit and a display unit having about 17 digits are necessary.

For this reason, in a conventional apparatus for displaying the entire telephone number, the number of display digits is too large, and a display space cannot be reduced. As a result, the display unit becomes large in size, and the auto-dialing apparatus itself cannot be made compact.

In recent years, some telephone service companies provides services for a credit call. In a credit call system, a telephone number and an identification number (password) are registered in a telephone service company, and telephone charges are paid at a later time. In the case of a credit call, an access number to the telephone service company, a number for specifying a caller or a telephone number of a caller, a password, and the like must be dial-input in addition to a telephone number of a callee. Therefore, when a credit call is to be made using the auto-dialing apparatus, the telephone numbers and the identification numbers must be pre-stored. However, in the conventional auto-dialing apparatus, a storage capacity enough to perform a credit call is not assigned to one telephone number. Thus, the conventional auto-dialing apparatus cannot cope with a credit call. A storage capacity capable of storing various numbers necessary for a credit call may be assigned to each telephone number data. In this case, however, a portable compact auto-dialing apparatus having a limited total storage capacity must inevitably reduce the number of telephone number data to be stored. When various telephone numbers are additionally stored in units of telephone number data, since the various telephone number portions are the same for any telephone number data, the storage unit is very wastefully used.

Such a drawback occurs not only in a credit call but also in, e.g., an international call since an international telephone identification number, national number, or the like must be set.

SUMMARY OF THE INVENTION

The present invention has been made in consideration of the above situation and has as its object to provide an auto-dialing apparatus which can efficiently display telephone number data stored in a memory on a display unit having a relatively small space, and can store a relatively long telephone number by efficiently utilizing a storage unit.

In order to achieve the above object, according to the present invention, there is provided first telephone number data storage means for storing first telephone number data including a plurality of numerical value data;

second telephone number data storage means for storing symbol data and second telephone number data including a plurality of numerical value data;

readout control means for sequentially reading out the symbol data and the second telephone number data including the plurality of numerical value data from said second telephone number data storage means; and dialing signal output control means for, when the data read out by said readout control means is the numerical value data, converting the numerical value data into a dialing signal and outputting the dialing signal, and for, when the readout data is the symbol data, converting the first telephone number data stored in said first telephone number data storage means into a dialing signal and outputting the dialing signal.

With the above arrangement, relatively long telephone number data can be efficiently displayed on a small space, and a wasteful use of a storage unit can be prevented. When auto-dialing of a long telephone number for a credit call, an international call, or the like is performed, the apparatus of the present invention is very small in size and, hence, can be easily used.

BRIEF DESCRIPTION OF THE DRAWINGS

FIG. 8 shows a format of a RAM shown in FIG. 7;

DETAILED DESCRIPTION OF THE PREFERRED EMBODIMENTS

First Embodiment

Figure 1:
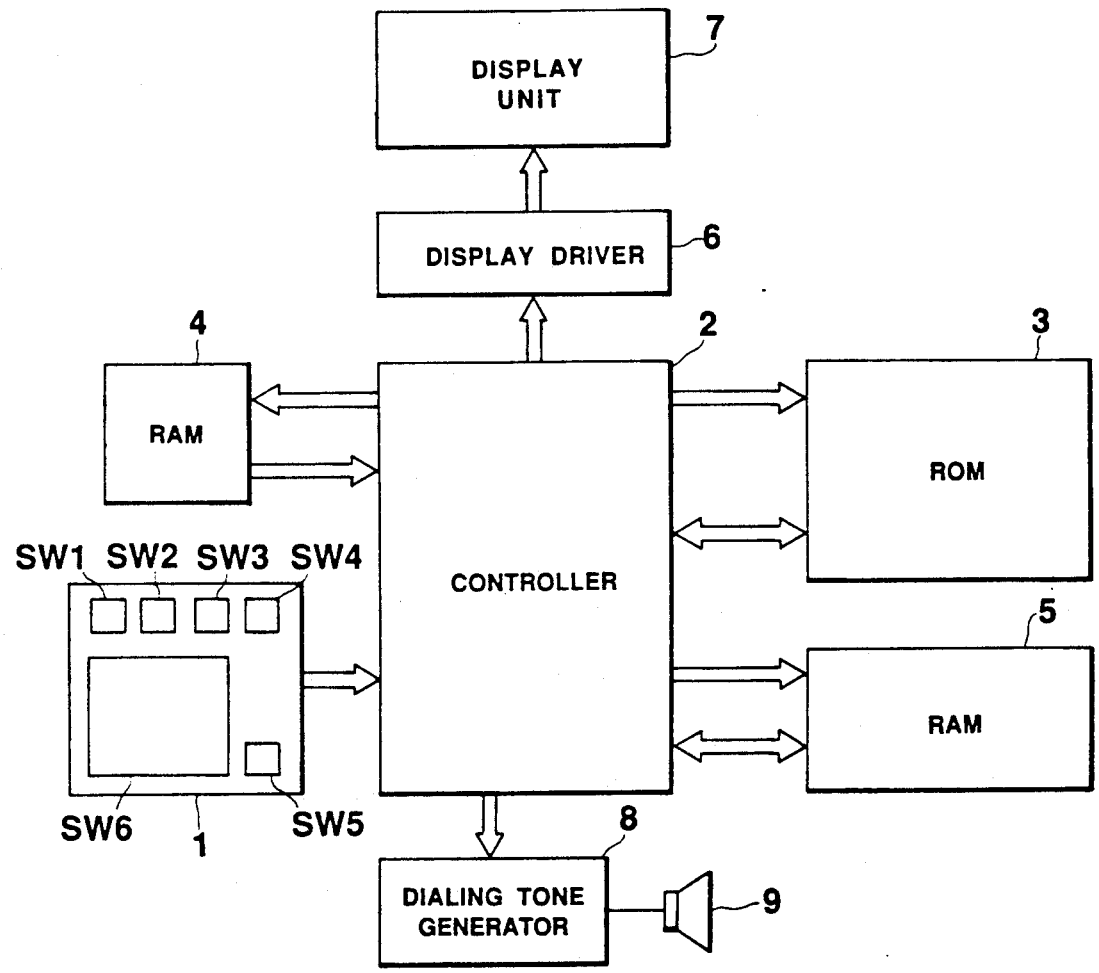
FIG. 1 is a block diagram showing an embodiment of the present invention.

FIG. 1 is a block diagram of a first embodiment of the present invention.

A key input unit 1 comprises a mode switch SW1 for switching a normal mode for displaying name and telephone number data stored in a RAM 5 (to be described later) and a set mode for inputting new data; an input data switch SW2 for switching a mode for inputting identification data (to be described later) and corresponding numerical value data, and a mode for inputting name, identification data, and remaining numerical value data in the set mode; an identification data display switch SW3 for switching to sequentially display the identification data and the corresponding numerical value data; a telephone number data display switch SW4 for switching to sequentially display the name, identification data, and the remaining numerical value data; and a dialing tone output switch SW5 for switching to convert a telephone number displayed on a display unit 7 (to be described later) into dialing tones and to output the dialing tones. Note that a switch SW6 is a keyboard switch having alphanumerical keys, and is used for inputting characters and numerical values in the set mode. Input data input from the key input unit 1 is output to a controller 2.

The controller 2 comprises a microprocessor (central processing unit), and performs various control operations on the basis of data input from the key input unit 1.

A ROM (read-only memory) 3 permanently stores a microprogram corresponding to the operations of this apparatus. The controller 2 executes functional processing operations in accordance with the microprogram from the ROM 3.

The controller 2 stores the character and numerical value data input from the key input unit 1 in RAMs 4 and 5.

The RAMs 4 and 5 are random-access memories. The controller 2 reads out data from the RAMs 4 and 5 in accordance with the program stored in the ROM 3, and sends the readout data to the display unit 7 through a display driver 6. The display unit 7 visually displays the input data, as will be described in detail later. The controller 2 sends the numerical value data to a dialing tone generator 8. The dialing tone generator 8 causes a speaker 9 to produce tones corresponding to the numerical value data.

Figure 2:
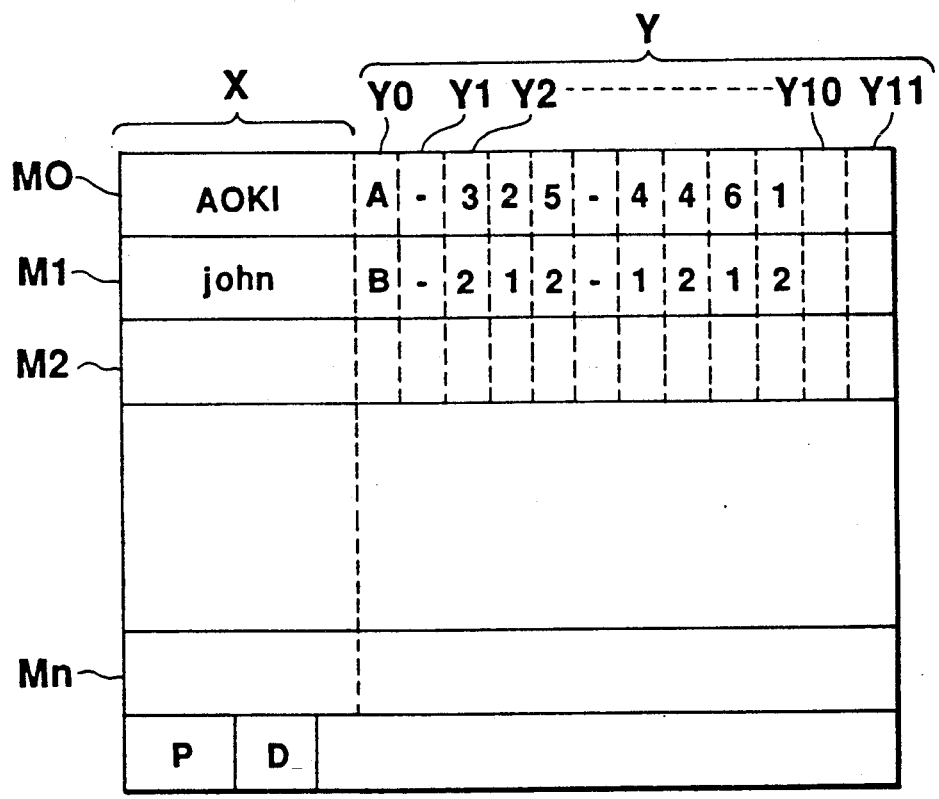
FIG. 2 shows a storage area of a RAM 5 shown in FIG. 1.

FIG. 2 shows memory areas of the RAM 5. The RAM 5 has memories M0 to Mn for respectively storing name data and telephone number data including identification data (to be described later). Each of the memories M0 to Mn has a name data storage area X for storing name data and a number data storage area Y including digit memories Y0 to Y11 for storing telephone number data. The RAM 5 also has an address designation register P for designating an address of one of the memories M0 to Mn and a digit designation register D for designating one of the digit memories Y0 to Y11.

Figure 3:
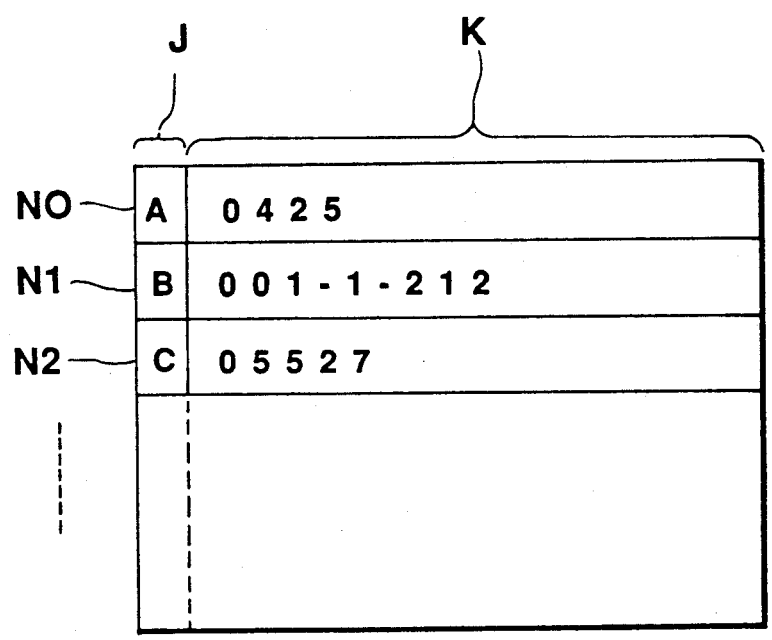
FIG. 3 shows a storage area of a RAM 4 shown in FIG. 1.

FIG. 3 shows memory areas of the RAM 4. The RAM 4 includes memories N0, N1, N2, . . . for storing identification data and corresponding telephone number numerical value data. Each of the memories N0, N1, N2, . . . includes an identification data storage area J for storing identification data and a number data storage area K for storing telephone number numerical value data corresponding to the identification data stored in the storage area J.

Figure 4:
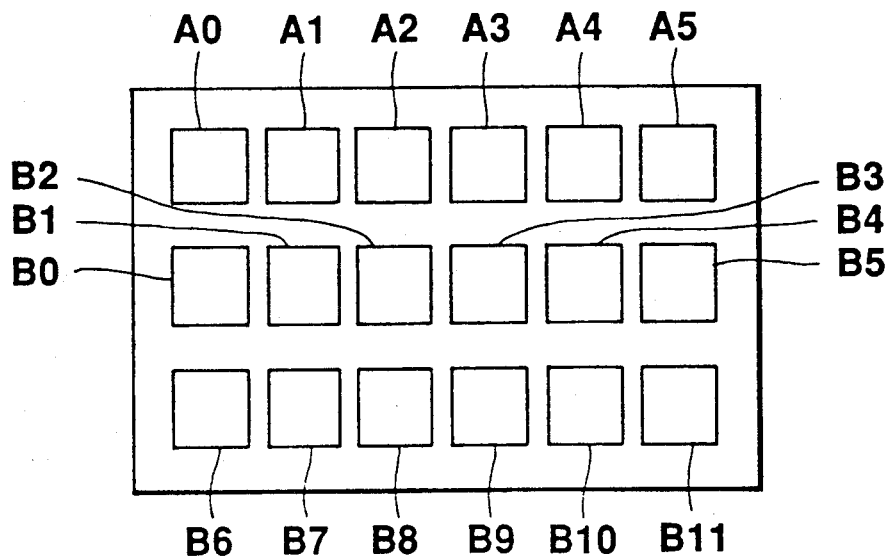
FIG. 4 is a plan view of a display unit 7 shown in FIG. 1.

FIG. 4 is a plan view of the display unit 7. The display unit 7 comprises a liquid-crystal display device. Six digits of dot matrix display portions (dot display portions) A0 to A5 are provided to form an upper row, six digits of dot display portions B0 to B5 are provided to form a middle row, and dot display portions B6 to B11 are provided to form a lower row. Each dot display portion (digit) comprises 5×5 display electrodes, and the display electrodes are selectively turned on to display a character or number.

FIGS. 5A to 5E show display states of characters, identification data, numerical value data, and the like stored in the RAMs 4 and 5 on the dot display portions of the display unit 7. The set mode is selected by operating the mode switch SW1. The input data switch SW2 is then operated to select a mode for inputting identification data and corresponding numerical value data.

Figure 5A:
FIGS. 5A to 5E are views showing display states of the display unit 7.

FIG. 5A shows a display state before identification number and corresponding telephone number numerical value data are set in the RAM 4. FIG. 5B shows a display state when the switch SW6 is operated in the state of FIG. 5A to set identification data "A" and numerical value data "0425" corresponding to the identification data "A".

Figure 5D:
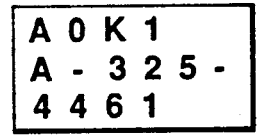
Figure 5B:
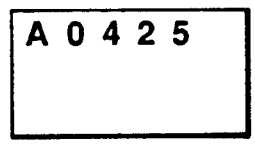
Figure 5E:
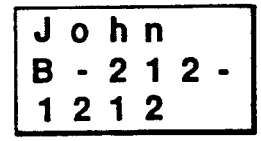
Figure 5C:
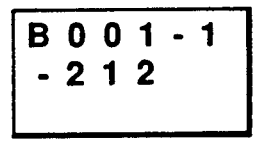

FIG. 5C shows a display state when a national number and trunk code "001-1-212" of an international telephone number are stored in correspondence with identification data "B" after the display switch SW3 is operated.

Upon operation of the input data switch SW2, the mode for inputting name and telephone number numerical value data in the RAM 5 is selected. Upon operation of the switch SW6, name and telephone number numerical value data are input.

FIG. 5D shows a display state when name data "AOKI" stored in the name data storage area X of the memory N0 of the RAM 5, identification data "A" stored in the first digit memory Y0 of the number area Y, and data "325-4461" stored in the digit memories after Y1 are displayed. FIG. 5E shows a display state when data "John" stored in the name data storage area X of the memory N1 of the RAM 5 and data "B-212-1212" stored in the number storage area Y are displayed.

When a display state is switched from FIG. 5D to FIG. 5E, i.e., when data stored in the memories N0, N1, N2, . . . of the RAM 5 are selectively displayed on the display unit 7, an operator operates the number data display switch SW4. That is, every time the display switch SW4 is operated, the storage contents (value) of the address designation register P of the RAM 5 is incremented, and telephone number data including name data, identification data, and telephone number numerical value data stored in a memory designated by the register P is sequentially displayed o the display unit 7. The operator brings the speaker 9 shown in FIG. 1 near a handset of a telephone set and operates the dialing tone output switch SW5 while desired name and telephone number data are displayed, so that dialing tones of the displayed telephone number data are produced.

Figure 6:
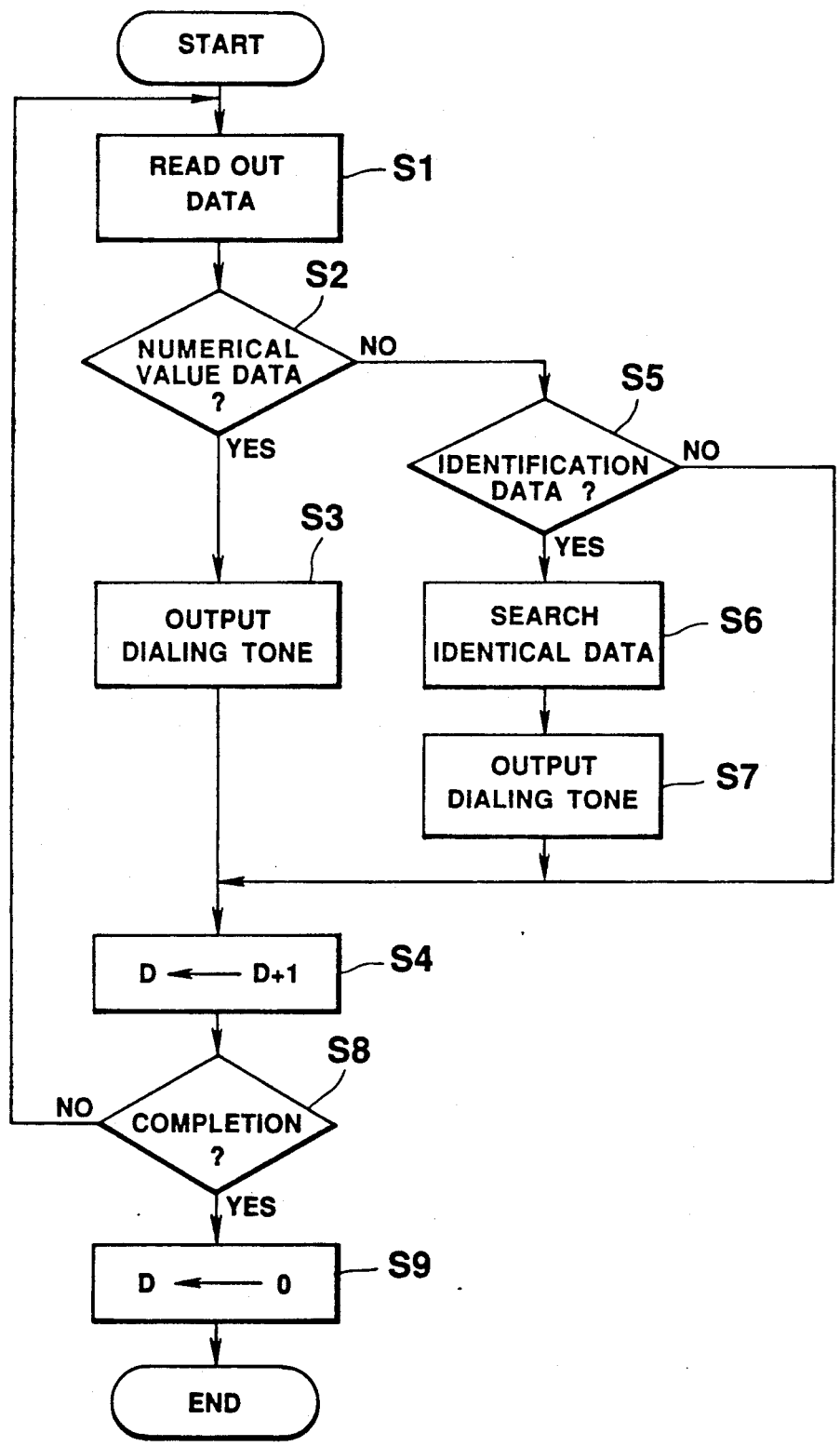
FIG. 6 is a flow chart of dialing tone generation processing.

FIG. 6 is a flow chart showing an operation of the arrangement shown in FIG. 1 when the dialing tone output switch SW5 is operated.

When the dialing tone output switch SW5 is operated, data stored in the digit memory Y0 designated by the register D of the line memory designated by the address designation register P of the RAM 5, i.e., "A" in the display state of FIG. 5D is read out in step S1. It is then checked in step S2 if the readout data is numerical value data to be directly converted to dialing tones. If YES in step S2, processing for outputting dialing tones (step S3) is executed. In step S4, processing for incrementing the data held in the register D by "1", i.e., processing for updating the digit memory designated by the register D to the next digit memory Y1 is executed.

If NO in step S2, the flow advances to step S5. It is checked in step S5 whether the data in the digit memory Y0 is identification data (English letter) or other data. If YES in step S5, data in the identification data area J of the RAM 4 are searched to find the storage area (N0) storing the identical data "A". In step S7, dialing tones of all the numerical value data corresponding to the identical data "A", i.e., all the data stored in the number data storage are K of the RAM 4 are output. After the dialing tones are output in step S7, the flow advances to step S4, and the value held in the register D is incremented by "1".

If NO in step S5, i.e., if it is determined that data held in the digit memory Y0 is not identification data, the flow advances to step S4.

After step S4 for incrementing the value held in the register D by "1", it is checked in step S8 if processing for all the data is completed. More specifically, if the above processing is repeated and the value held in the register D reaches D=12, it is determined that outputting of data in all the digit memories Y0 to Y11 is completed (YES in step S8). In step S9, the value held in the register D is reset to 0, and the processing is ended. If the value of the digit memory designated by the register D is D≦11, since the dialing tone generation processing is not completed yet (NO in step S8), the flow returns the data readout processing in step S1, and the processing continues. With the above processing, when the dialing tone output switch SW5 is operated in the display state of FIG. 5D, dialing tones corresponding to "0425" corresponding to the letter "A" stored in the RAM 4 and "325-4461" stored in the RAM 5 are output.

When the dialing tone output switch SW5 is operated while the memory M1 is selected and designated by the address designation register P, and data "John" is displayed on the upper row and data "B-212-1212" is displayed on the middle and lower rows, as shown in FIG. 5E, data "B" in the digit memory Y0 is read out in step S1. The flow advances along steps S2, S5, and S6, and the memory N1 of the RAM 4 is selected. In step S7, dialing tones corresponding to numerical value data "0011212" are produced in step S7. Thereafter, dialing tones corresponding to data "2121212" stored in the digit memories Y1 to Y11 of the line memory M1 of the RAM 5 are produced.

In this manner, according to the present invention, since a long telephone number is displayed while being replaced with short identification data, a telephone number can be displayed in a small space.

In the above embodiment, a plurality of numerical values represented by the identification data are upper numerical values of a telephone number, but may be a plurality of numerical value data of an intermediate portion of a telephone number. Once identification data is set in the RAM 4, when another telephone number is input to the auto-dialing apparatus, the already input identification data need only be input, thus simplifying an input operation.

Second Embodiment

FIGS. 7 to 16 show another embodiment of the present invention.

Figure 7:
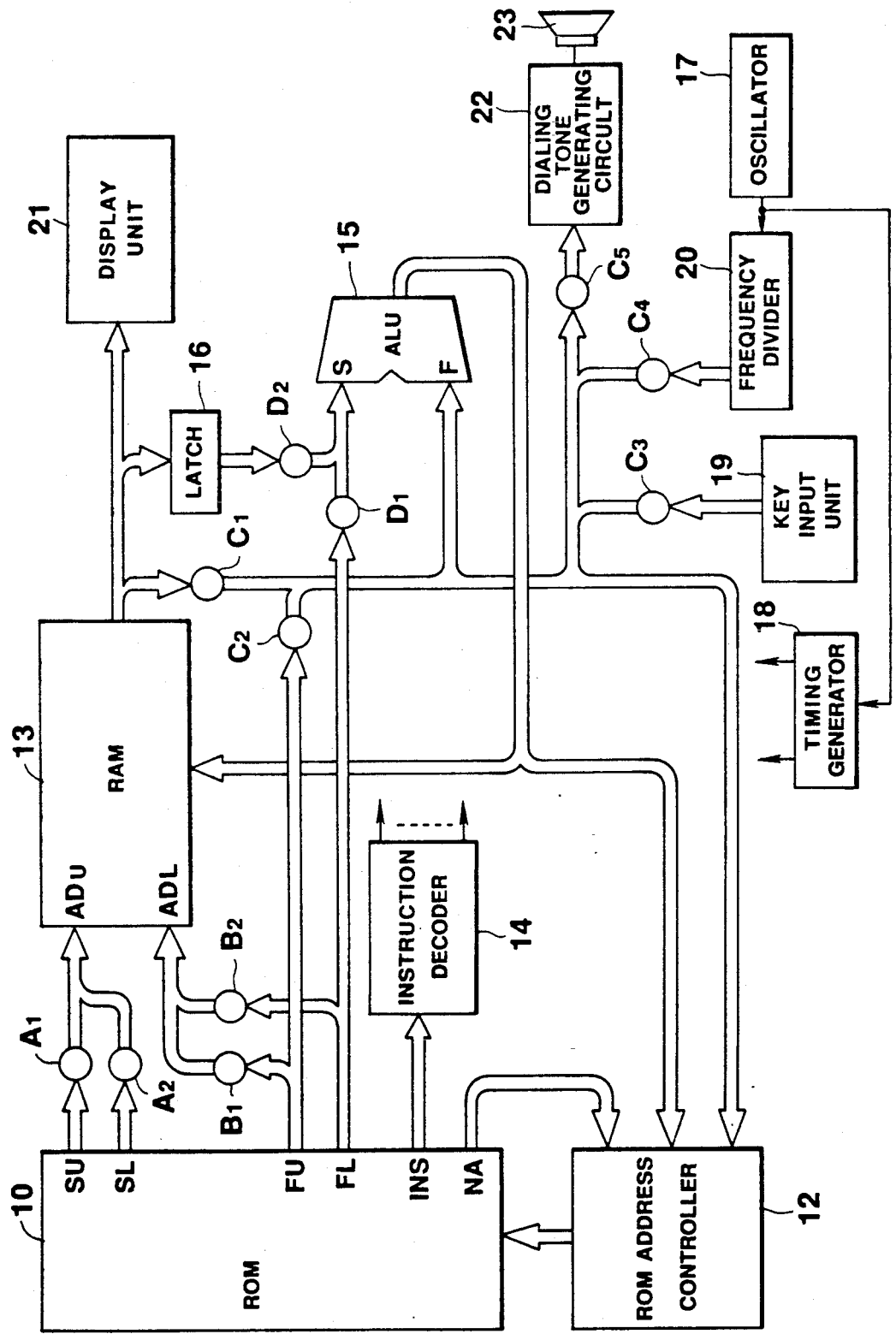
FIG. 7 is a block diagram showing another embodiment of the present invention.

FIG. 7 is a block diagram showing an arrangement of this embodiment. In FIG. 7, a ROM 10 is a memory prestoring a microprogram for controlling the entire system and various data. A ROM address controller 12 is a section for controlling addresses of the ROM 10 for defining a program flow. The controller 12 receives an output $N_A$ for designating the next address of the ROM 10, an output from an arithmetic and logic unit (ALU) 15, and an output from a frequency divider 20 (to be described later). A RAM 13 outputs data held in a storage area designated by address data $S_L$, $S_L$, $F_U$ and $F_L$ output from the ROM 10. The RAM 13 receives and stores data processed by the ALU 15. An instruction decoder 14 decodes an instruction output INS of the ROM 10, and sends a control signal to respective blocks. The ALU 15 performs arithmetic logic operations of input data S and F, and writes its output in the storage area of the RAM 13 designated by the output $F_U$ and $F_L$ of the ROM 10. A latch 16 temporarily stores data stored in the storage area of the RAM 13 designated by the outputs $S_U$ and $S_L$ of the ROM 10, and sends the storage data to the ALU 15 as input data S in synchronism with supply of data F to the ALU 15.

An oscillator 17 outputs a clock signal having a predetermined period. A timing generator 18 frequency-divides the clock signal to a predetermined frequency to output a timing signal for time-serially controlling the respectively blocks. A key input unit 19 includes switches $K_1$ to $K_6$ (to be described later), and outputs switch input signals. The frequency divider 20 is a counter for frequency-dividing an output from the oscillator 17. The frequency divider 20 outputs a time-piece signal having a predetermined period to update present time data stored in the RAM 13.

A display unit 21 is a circuit block for displaying data. A dialing tone forming circuit 22 forms frequency signals of corresponding dialing tones based on input telephone number data, and the like, and supplies the signals to a speaker 23. The speaker 23 produces corresponding dialing tones upon reception of the signals.

But control gates A1, A2, B1, B2, C1, to C5, D1, and D2 control bus lines on the basis of an output from the instruction decoder 14, and the like.

FIG. 8 shows a memory format of the RAM 13. A display register DR stores data to be displayed on the display unit 21. A timepiece register TR stores present time data. A mode register M designates a mode. When the value of the mode register M is "0", the register M designates a timepiece mode for displaying present time data stored in the timepiece register TR on the display unit 21; "1", a normal data display mode for displaying one of telephone number data in a normal data storage section ND (to be described later) on the display unit 21; "2", an alarm time display mode for displaying alarm time; "3", a stopwatch display mode for displaying measurement data of a stopwatch; "4", a pass code number input mode for requesting an operator to input a pass code number; "5", a secret data display mode for displaying a telephone number stored in a secret data storage section SD (to be described later) on the display unit 21; "6", a regular call data mode for displaying and setting company name and regular code data (including a call number of a credit call service company); and "7", a credit call mode for producing dialing tones associated with one of telephone numbers stored in the normal data storage section ND and the secret data storage section SD and the regular code data to perform a credit call. Pointers P1 and P2 are registers for designating one of a plurality of telephone number data stored in the normal data storage section ND and the secret data storage section SD. A pointer P3 is a register for designating one of a plurality of regular call data stored in a regular call data storage section CD (to be described later). A previous mode register N stores an immediately preceding mode (normal data display mode or secret data display mode) when the credit call mode is designated. More specifically, the previous mode register N is a register for storing mode data associated with the immediately preceding mode. The normal data storage section ND stores a large number of telephone number data (name and telephone number) which need not be kept secret. A data division code a is stored in a beginning portion of each telephone number data, serves as a division between adjacent telephone number data, and consists of, e.g., two bits of "0" and "0". A character/numerical value division code b is a code for indicating a division between a portion associated with a telephone number (i.e., numerical values) and a corresponding name (i.e., characters), and includes, e.g., two bits of "1" and "1". The secret data storage section SD includes a pass code number storage area PC for storing the pass code and a storage area for storing telephone number data which must be kept secret. In the secret data storage section SD, the data division code a and the character/numerical value division code b are used for the same purposes as described above. The regular call data storage section CD stores abbreviations of credit call service companies (to be referred to as company names hereinafter) and regular code data when a credit call is performed by utilizing these companies in correspondence with each other. For example, the regular call data storage section CD stores regular call data including a company name "TELEWAY" and regular code data "0070 ... 1234" used when this company is used. Note that letter "U" in the regular code is a special symbol, and indicates that a callee's telephone number is inserted and corresponding dialing tones are output, as will be described in detail later. Each letter "P" in the regular code indicates a timing for stopping a dialing output for a predetermined period of time (e.g., 3 seconds). In the regular call data storage section CD, the data division code a and the character/numerical value division code b are used for the same purposes as described above. The RAM 13 also includes a register for storing alarm time, a register for storing a measurement time of a stopwatch, and the like.

Figure 9:
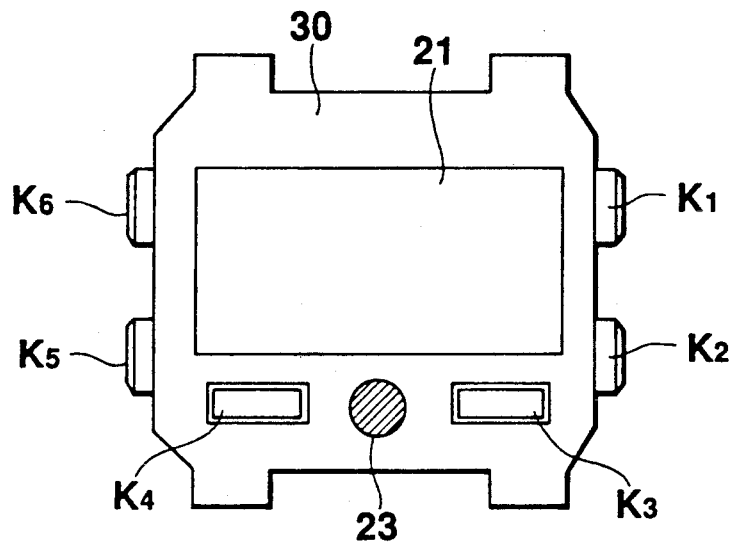
FIG. 9 is a view showing an outer appearance of this embodiment.

FIG. 9 shows an outer appearance of an electronic wristwatch incorporating the circuit shown in FIG. 7. The display unit 21 comprising a liquid-crystal display device for displaying time, a telephone number, or the like is disposed at the center of the front surface of a wristwatch case 30. The speaker 23 for producing dialing tones is arranged at a central portion below the display unit 21. Push-button type switches $K_3$ and $K_4$ are arranged on the right and left portions of the upper surface of the wristwatch case 30. Switches $K_1$, $K_2$, $K_5$, and $K_6$ are arranged on the right and left side surfaces of the wristwatch case 30.

Figure 10:
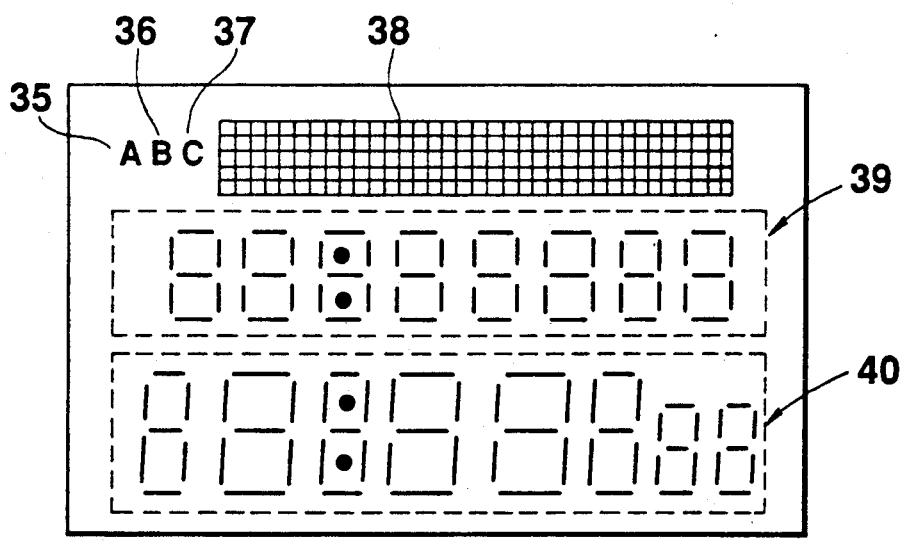
FIG. 10 shows an array of display elements on a liquid-crystal display panel in FIG. 9.

FIG. 10 shows an array state of display elements (display electrodes) on the display unit 21. Each of display elements 35, 36, and 37 for respectively display letters "A", "B", and "C" indicates the storage order of a company name in the regular call data storage section CD when it is displayed on a dot matrix display portion 38. For example, the display element 35, i.e., "A" is turned on when the first company name "TELEWAY" in the regular call data storage section CD in FIG. 8 is displayed. The dot matrix display portion 38 displays day and date data and character data such as a name or the like in telephone number data. Each of 7-segment display portions 39 and 40 includes 8 digits of 7-segment display elements, and displays time data and numerical value data (telephone number), hyphen, letters "U" and "P", and the like in the telephone number data.

The operation of this embodiment with the above arrangement will be described below.

Figure 11:
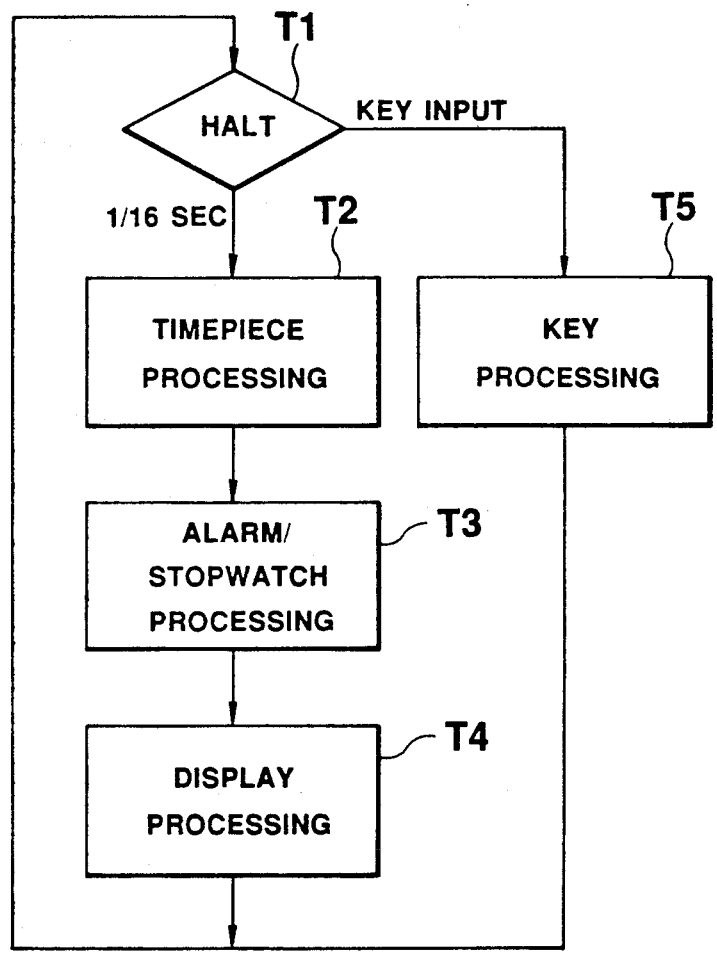
FIG. 11 is a general flow chart of an operation of this embodiment.

FIG. 11 shows a general flow chart schematically showing the operation of this embodiment. In step T1, a time count signal input from the frequency divider 20 at every 1/16 sec and a key input signal from the key input unit 19 are waited. When the time count signal is output, the flow advances to step T2, and time updating processing for obtaining present time data, i.e., timepiece processing of the timepiece register TR of the RAM 13 is executed. The flow advances to step T3, and alarm/stopwatch processing such as an alarm time detection operation, a stopwatch time measurement operation, or the like is executed In step T4, the processing result is displayed on the display unit 21. Thereafter, the flow returns to step T1. On the other hand, if the key input signal is output from the key input unit 19 in the HALT state in step T1, the flow advances to step T5, and corresponding key processing is executed. Thereafter, the flow returns to step T1.

Figure 12:
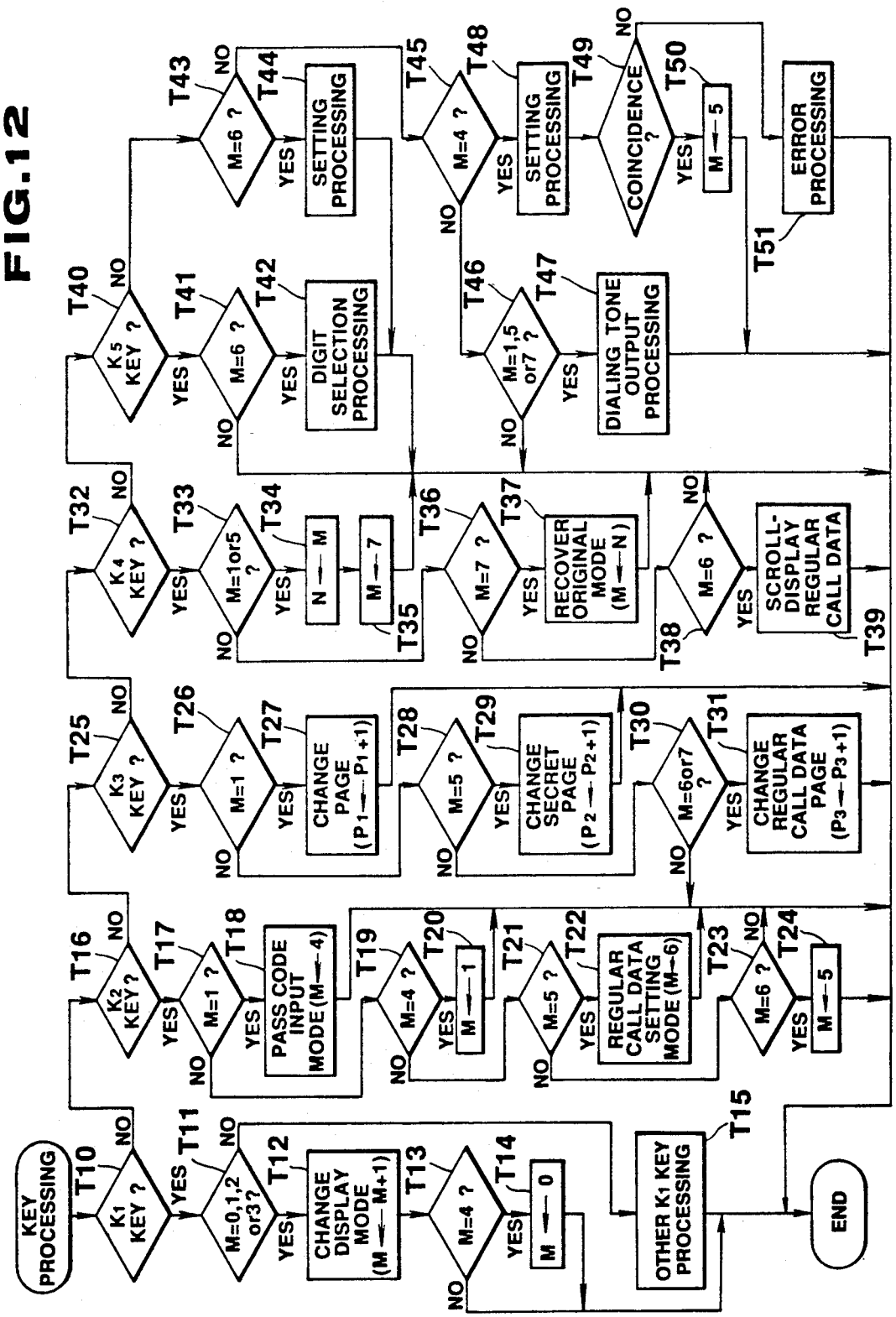
FIG. 12 is a flow chart showing in detail key processing in FIG. 11.
Figure 13:
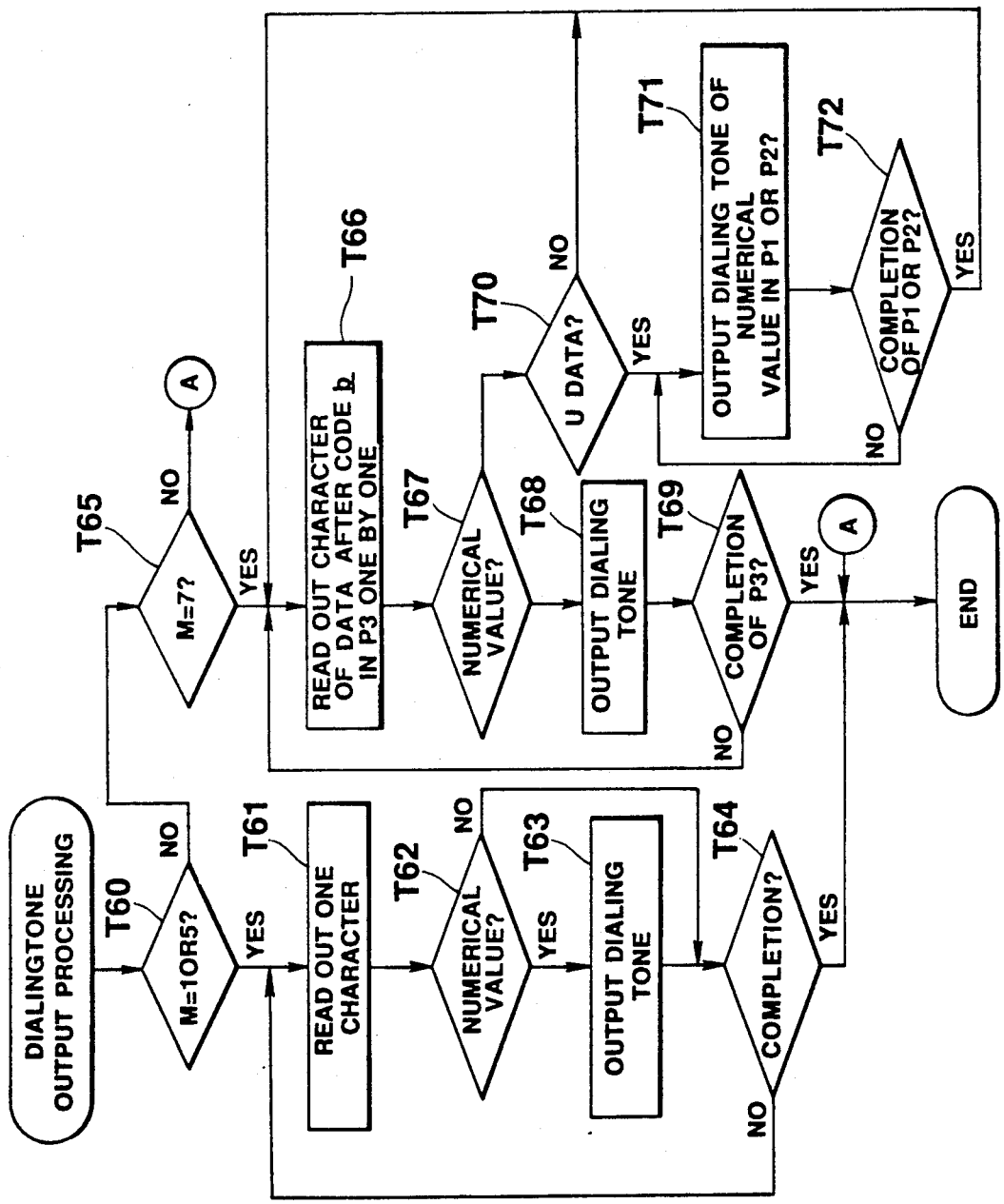
FIG. 13 is a flow chart showing in detail dialing tone output processing in FIG. 12.
Figure 14:
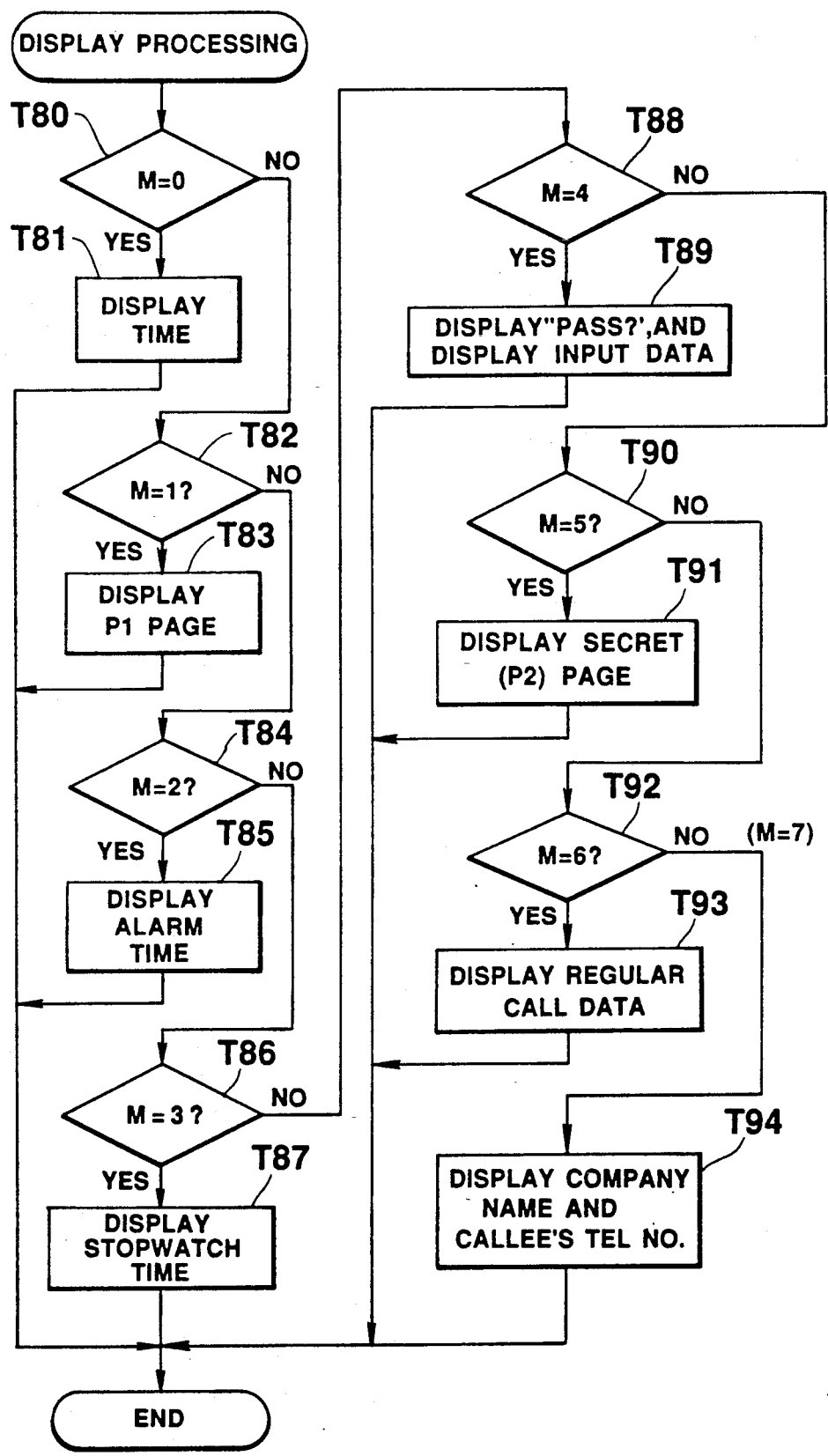
FIG. 14 is a flow chart showing in detail display processing in FIG. 11.
Figure 15:
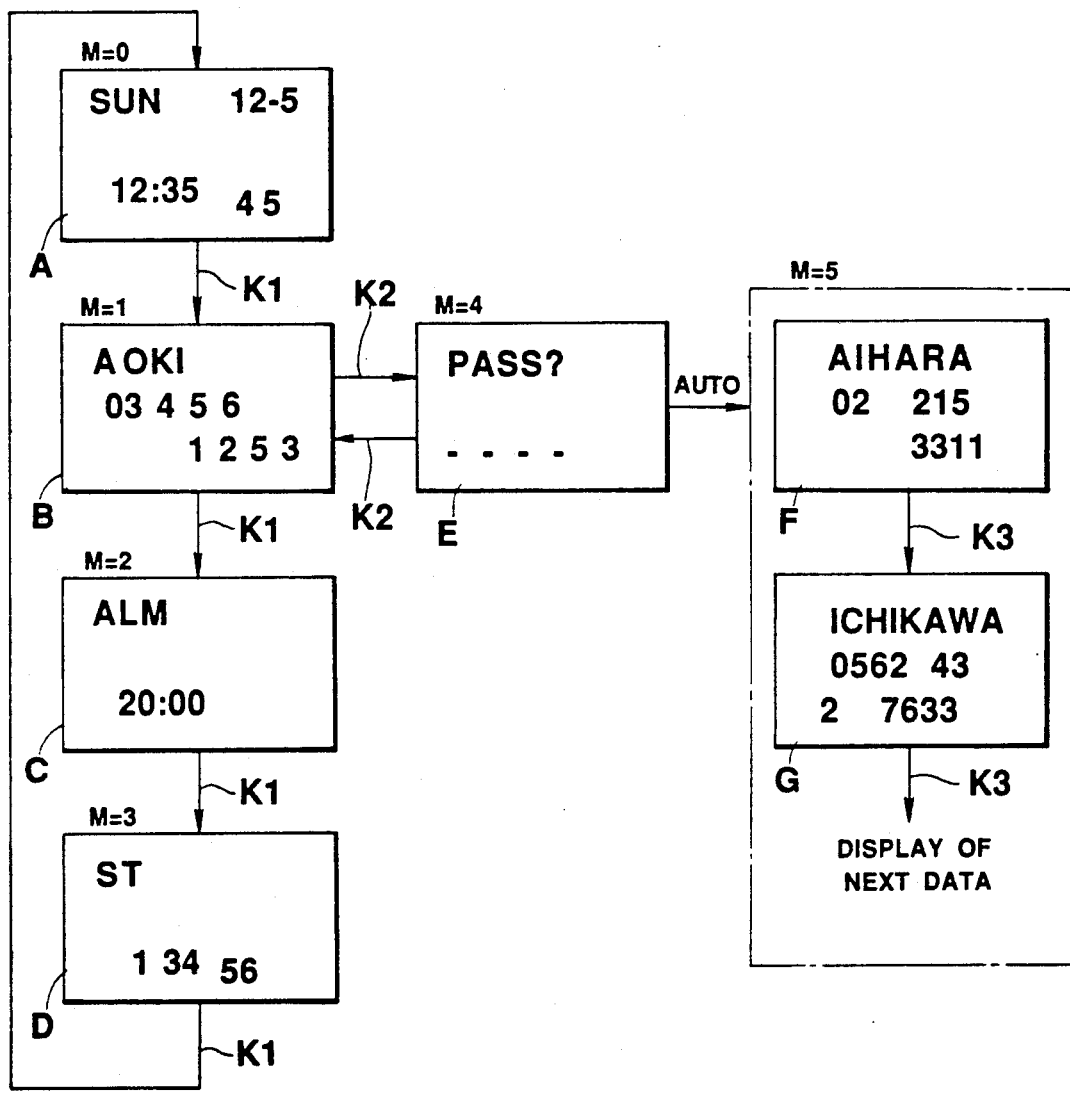
FIGS. 15 and 16 are transition charts showing display states of the liquid-crystal display panel upon various switching operations.
Figure 16:
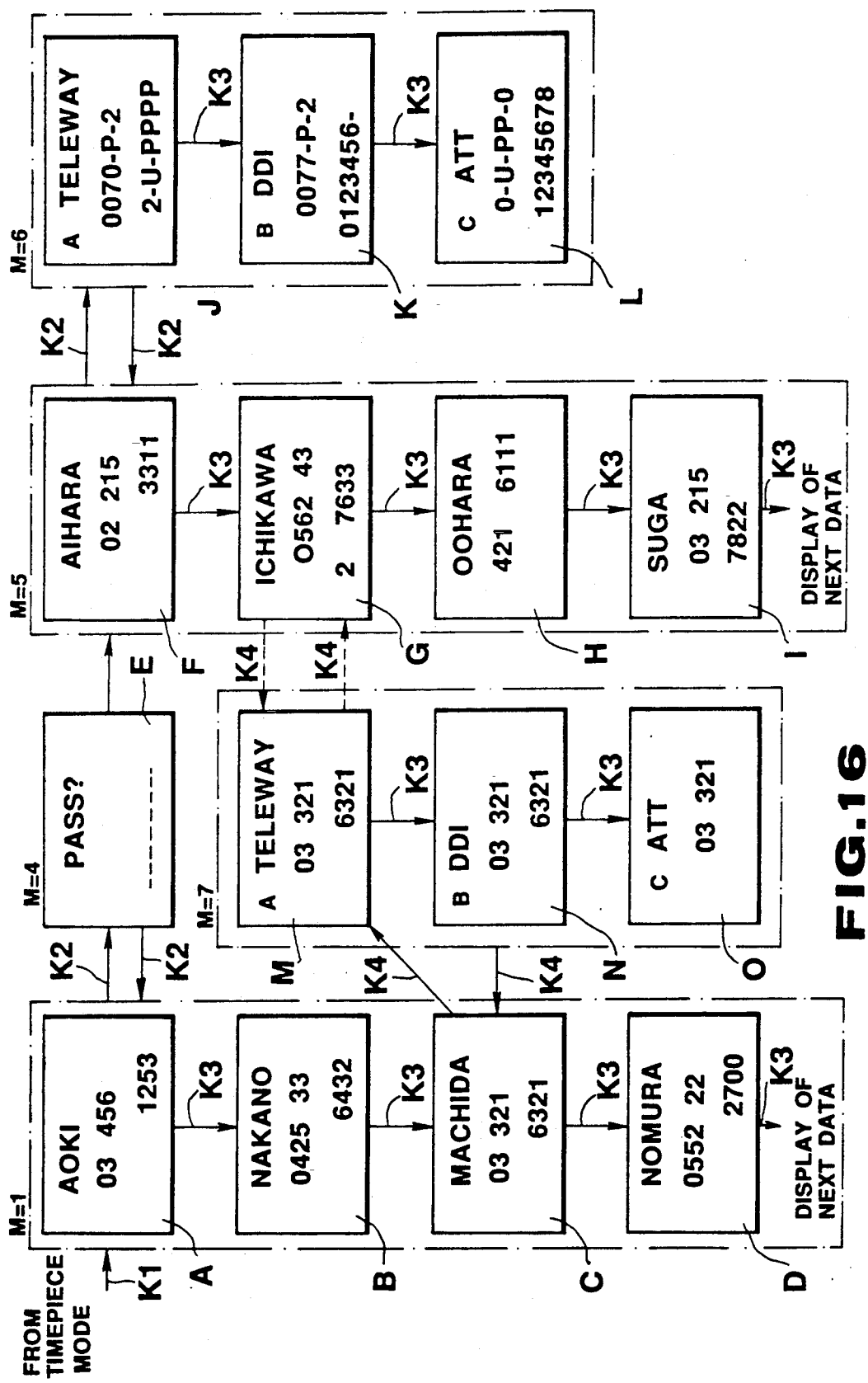

FIG. 12 is a flow chart showing in detail the key processing in step T5. FIG. 13 is a flow chart showing in detail dialing tone output processing in step T47 in FIG. 12. FIG. 14 is a flow chart showing in detail display processing in step T4 in FIG. 11. FIGS. 15 and 16 show transition charts of display states of the display unit 21 upon various switching operations. The operation of a dialing tone generation apparatus will be described along the transition charts of the display states shown in FIGS. 15 and 16 with reference to the flow charts.

For example, when the value of the mode register M is "0", it is determined that M = "0" in step T80 in the display processing shown in FIG. 14. In step T81, time display processing is executed. Therefore, the present time in the timepiece register TR is displayed on the display unit 21, as shown in a display state A in FIG. 15.

When the switch $K_1$ is operated in the display state A, this operation is detected in step T10 in FIG. 12, and it is determined in step T11 that the value of the mode register M is "0". In step T12, increment processing for incrementing the content of the mode register M by "1" is executed. Thus, the value of the mode register M becomes "1". It is then determined in step T13 that the value of the mode register M is not "4". The flow then returns to step T1. Therefore, if the timepiece signal is input at every 1/16 sec, in the display processing shown in FIG. 11, it is determined in step T80 that the timepiece mode (M = 0) is not selected, and the flow advances to step T82, as shown in the flow chart in FIG. 14. It is detected in step T82 that M = "1", and the flow advances to step T83. In step T83, telephone number data in the normal data storage section ND designated by the content of the pointer P1 at that time is displayed on the display unit 21. Thus, the display unit 21 displays a name "AOKI" and telephone number "03 456 1253", as shown in a display state B in FIG. 15.

If the switch $K_1$ is operated again in this state, this operation is detected in step T10 in FIG. 12. In step T11, it is detected that the value of the mode register M is "1" and indicates the normal data display mode. In step T12, the value of the mode register M is updated to "2". The apparatus is thus set in the alarm time display mode. Thereafter, it is detected in step T13 that the value of the mode register "M" is not "4", and the flow returns to step T1. When the timepiece signal is output, in the flow chart of the display processing in FIG. 14, the flow reaches step T84 via steps T80 and T82. In step T84, it is detected that the alarm time display mode (M = "2") is selected. In step T84, alarm time set in a register (not shown) of the RAM 13 is displayed on the display unit 21. Therefore, when "20:00" is set as alarm time data, the display unit 21 is set in a display state C in FIG. 15.

When the switch $K_1$ is further operated in this state, the value of the mode register M is updated to "3" in steps T10, T11, T12, and T13 described above. Thereafter, every time the timepiece signal is output, in the flow chart in FIG. 14, the flow reaches step T86 via steps T80, T82, and T84. It is detected in step T86 that the stopwatch display mode (M = "3") is selected. In step T87, stopwatch information is displayed on the display unit 21, as shown in a display state D in FIG. 15.

When the switch $K_1$ is further operated in this state, the content of the mode register M is incremented by "1" in steps T10, T11, T12, and T13 described above, and its value becomes "4". Thereafter, it is detected in step T13 that the value of the mode register M has already become "4". As a result, the value of the mode register M is reset to "0" in step T14. Therefore, a display on the display unit 21 returns to the display state A in FIG. 15.

An operation when telephone number data in the normal data storage section ND are sequentially displayed on the display unit 21 in the normal data display mode will be described below.

A display state A in FIG. 16 corresponds to the display state B in FIG. 15. When the switch $K_3$ is operated in the display state A in FIG. 16, this operation is detected in step T25 in FIG. 12, and the flow advances to step T26. It is detected in step T26 that the normal data display mode, i.e., M = "1" is selected. In step T27, the content of the pointer P1 is incremented by "1". Therefore, in the display processing in FIG. 14, the flow reaches step T83 via steps T80 and T82, and new telephone number data in the normal data storage section ND designated by the pointer P1 is displayed on the display unit 21. For example, if name data next to data "AOKI" is "NAKANO", data "NAKANO" and telephone number data "0425 33 6432" are displayed, as shown in a display state B in FIG. 16. Every time the switch $K_3$ is operated, similar processing is executed. Therefore, the value of the pointer P1 is sequentially incremented by "1", and telephone number data in the normal data storage section ND designated by the incremented value of the pointer P1 are sequentially displayed on the display unit 21, as shown in display states C and D in FIG. 16.

In the normal data display mode, i.e., when one of telephone number data in the normal data storage section ND is displayed on the display unit 21, if the operator operates the switch $K_6$, the flow reaches step T46 via steps T40, T43, and T45. In step T46, it is detected that the normal data display mode, i.e., M = "1" is selected. In step T47, dialing tone output processing is performed. FIG. 13 shows the dialing tone output processing in step T47 in detail. In step T60, it is detected that M = "1". In step T61, telephone number data which is being displayed on the display unit 21, i.e., the telephone data in the normal data storage section ND designated by the pointer P1 is sequentially read out character by character. It is then checked in step T62 if the readout data is numerical value data. If YES in step T62, the read out data is converted to dialing tones in step T63, and the dialing tones are output. It is checked in step T64 if processing of last data is executed. Thus, the operator can perform autodialing in the normal data display mode upon operation of the switch $K_6$.

Operation in Secret Mode Requiring Pass Code Number Input

An operation of the apparatus in the secret mode in which data which must be kept secret can be utilized only when a user inputs a pass code number registered in advance will be described below.

The pass code number is input after the switch $K_2$ is operated in the normal data display mode shown in the display state B in FIG. 15 and display states A to D in FIG. 16 to select the pass code input mode as shown in a display state E in FIG. 15 and a display state E in FIG. 16. The operation of the switch $K_2$ is detected in step T16 in FIG. 12. It is determined in step T17 that the normal data display mode is set. In step T18, data "4" is set in the mode register M to select the pass code input mode. In the display processing in FIG. 14, it is detected in step T88 that the pass code input mode, i.e., M = "4" is set. In step T89, a message requesting inputting of a pass code number, i.e., "PASS?" is displayed on the display unit 21. Therefore, the display unit 21 is set in the display state E in FIG. 15 and the display state E in FIG. 16.

Upon observation of the above display state, the operator inputs the pass code number using the switch $K_6$. When the switch $K_6$ is operated in the pass code input mode (M = "4"), in the key processing in FIG. 12, the flow advances from step T40 to step T45 via step T43. It is detected in step T45 that the pass code number input mode, i.e., M="4" is set. In step T48, an input number is set in a predetermined register.

In step T49, the input pass code number is compared with the pass code stored in the pass code storage area PC of the secret data storage section SD in FIG. 8. If a noncoincidence is detected in step T49, data "5" is set in the mode register M (step T50), thus setting the secret data display mode.

In this manner, in the display processing in FIG. 14, it is determined in step T90 that M="5". In step T91, telephone number data in the secret data storage section SD designated by the pointer P2 is displayed on the display unit 21. In this case, the display unit 21 displays data, as shown in a display state F in FIG. 15 and a display state F in FIG. 16.

Every time the switch $K_3$ is operated in this display state, telephone number data stored in the secret data storage section SD are sequentially displayed on the display unit 21, as shown in display states F, G, H, and I in FIG. 16. More specifically, the operation of the switch $K_3$ is detected in step T25 in FIG. 12, and the flow advances from step T26 to step T28. It is determined in step T28 that the secret data display mode (M="5") is set. In step T29, the value of the pointer P2 is incremented by "1". Since telephone number data in the secret data storage section SD designated by the pointer P2 is displayed on the display unit 21 in steps T90 and T91 in FIG. 14, as described above, the secret data are sequentially displayed every time the switch $K_3$ is operated.

When the operator operates the switch $K_6$ while any one of telephone number data stored in the secret data storage section SD is displayed on the display unit 21, the flow advances to step T46 via steps T40, T43, and T45 in FIG. 12 as in the normal data display mode described above. It is determined in step T46 that the secret data display mode is set. In step T47, steps T60 to T64 shown in FIG. 13 are executed, thus executing processing for converting the telephone number into dialing tones and outputting the dialing tones. The operator can perform auto-dialing of telephone numbers stored in the secret data storage section SD as in autodialing of telephone numbers stored in the normal data storage section ND.

Display and Correction of Credit Call Number

An operation in the regular call data mode for setting new data in the regular call data storage section CD for storing data such as a company name providing services for a credit call and an associated telephone number, or correcting or confirmation-displaying the already set data will be described below. Some regular call data, e.g., pass codes require secrecy. The mode for displaying regular call data on the display unit 21, i.e., the regular call data mode can be accessed only from the secret data display mode after a pass code number is input.

More specifically, after the pass code is input in the display state E in FIG. 16, the switch $K_2$ is operated to switch a secret data display in the display states F to I in FIG. 16, so that regular call data is displayed as shown in display states J, K, and L in FIG. 16.

Assume that the apparatus is now set in the secret data display mode, and the switch $K_2$ is operated. This operation is detected in step T16 in FIG. 12. The flow then advances to step T21 via steps T17 and T19 to determine that the secret data display mode (M="5") is set. In step T22, "6" is set in the mode register M to set the regular call data mode. Therefore, in the display processing in FIG. 14, it is detected in step T92 that the regular call data mode (M="6") is selected. In step T93, regular call data designated by the pointer P3 is displayed on the display unit 21.

In order to sequentially display regular call data set in the regular call data storage section CD except for one being displayed on the display unit 21, the operator operates the switch $K_3$, as shown in FIG. 16. The operation of the switch $K_3$ is detected in step T25 in FIG. 12. The flow then advances to step T30 via steps T26 and T28. In step T30, it is determined that the regular call data mode is set. In step T31, processing for incrementing the value of the pointer P3 by "1" is executed. In the display processing in FIG. 14, it is determined in step T92 that the regular call data mode (M="6") is set. Thereafter, new regular call data designated by the pointer P3 is displayed on the display unit 21 in step T93. Therefore, every time the switch $K_3$ is operated, the content of the regular call data storage section is sequentially displayed, as shown in the display states J, K, and L in FIG. 16. When the number of characters of the regular call data is too large, only a part of the data is displayed on the display unit 21. In this case, the operator operates the switch K4 to scroll the displayed regular call data. More specifically, the operation of the switch $K_4$ is detected in step T32 in FIG. 12, and the flow then advances to step T39 via steps T33, T36, and T38. In step T39, scroll display processing is executed.

When regular call data is set in the regular call data storage section CD or the already set regular call data is corrected, digit selection and correction operations are performed by using the switches $K_5$ and $K_6$. More specifically, the operation of the switch $K_5$ is detected in step T40 in FIG. 12. In step T41, it is detected that the regular call data mode is set. In step T42, a digit to be corrected is changed. Upon operation of the switch $K_6$, NO is obtained in step T40, and the flow advances from step T40 to step T43 to detected that the regular call data mode (M="6") is set. In step T44, a numerical value or character at the selected digit is set or corrected.

After the regular call data is set or corrected as described above, the operator operates the switch $K_2$, as shown in FIG. 16, to recover the apparatus in the secret data display mode. In this case, the operation of the switch $K_2$ is detected in step T16, and the flow advances to step T23 via steps T17, T19, and T21 to determine that the regular call data mode is set. The flow then advances to step T24, and "5" is set in the mode register M to select the secret data display mode. Therefore, the display state of the display unit 21 is returned to that in the secret data display mode. Although not shown in FIG. 16, when none of switches K1 to $K_6$ are operated for a predetermined period of time in the secret data display mode, the timepiece mode is automatically resumed.

Auto-Dialing in Credit Call

A telephone call is made to a callee stored in the normal data storage section ND using regular code data prestored in the regular call data storage section CD, i.e., a credit call is made as follows. The operator operates the switch $K_3$ in the normal data display mode as described above to display a callee's telephone number on the display unit 21. More specifically, the display unit 21 is set in one of the display states A, B, C, D, . . . in FIG. 16. The operator then operates the switch K4.

In this case, the operation of the switch K4 is detected in step T32 in FIG. 12, and it is detected in step T33 that the normal data display mode (M="1") is selected. In step T34, the value of the mode register M, i.e., "1" is saved in the previous mode register N. In step T35, "7" is set in the mode register M to select the credit call mode. Thus, in the display processing in FIG. 14, the flow advances to step T94 via steps T80, T82, T84, T86, T88, T90, and T92, and a company name in the regular call data designated by the value of the pointer P3 at that time and callee's telephone number designated by the pointer P1 are displayed on the display unit 21. For example, when the switch K4 is operated to make a telephone call to Mr. "MACHIDA" at "03(321)6321" which are being displayed, as shown in the display state C in FIG. 16, if the pointer P3 designates the regular call data of the company name "TELEWAY", the display unit 21 is set in the display state M in FIG. 16. In this case, a regular code (including a pass code) is not displayed, thus keeping secrecy. Thereafter, in order to make a credit call upon auto-dialing, the operator operates the switch K6 in the same manner as described above. The flow then advances to step T46 via steps T43 and T45. In step T46, it is determined that the credit call mode is selected, and the flow advances to step T47, i.e., enters the flow chart of FIG. 13. In FIG. 13, the flow advances to step T65 via step T60. In this case, it is determined in step T65 that the credit call mode (M="7") is set. In step T66, data of a regular call portion of one of regular call data designated by the pointer P3 stored in the regular call data storage section CD is read out character by character. In step T67, it is checked if the readout data is numerical value data. If YES in step T67, the readout data is converted to a dialing tone and the dialing tone is output in step T68. Thus, in the case of a credit call through "TELEWAY", dialing tones corresponding to "0070.22" of a telephone number shown in FIG. 8 (this is an access number to the TELEWAY company) are output. Thereafter, if the readout data is not numerical value data but is the character data "U" described above, the flow advances from step T67 to step T70 to determine that the readout data is the "U" data. In step T71, a telephone number of telephone number data designated by the pointer P1 (in the above case, 03(321)6321) is converted to dialing tones one by one and the dialing tones are output. When the dialing tones corresponding to the entire telephone number are output, this is determined in step T71, and the flow returns to step processing in steps T66 to T69. Numerals in the regular code which are not output as dialing tones, i.e., "0425-55-7272" (own telephone number) and 01234 (own registration or identification number) are sequentially output as dialing tones.

In the display state M in FIG. 16, when another credit service company is to be utilized, the switch K3 is operated. This operation is detected in step T25 in FIG. 12, and the flow advances to step T30 via steps T26 and T28 to detect that the credit call mode is set. In step T31, the value of the pointer P3 is incremented by "1". Therefore, in step T94 in FIG. 14, a company name designated by the updated pointer P3 and a callee's telephone number designated by the pointer P1 are displayed on the display unit 21. More specifically, as shown in display states N and 0 in FIG. 16, every time the switch K3 is operated, regular call data in the regular call data storage section CD is designated, and its company name and the callee's telephone number are displayed on the display unit 21. When the switch K6 is operated in the above display states, dialing tones are output while inserting the callee's telephone number in the character symbol portion "U" of the regular code associated with the displayed credit service company. Note that in the above embodiment, the character "P" is not explained. When "P" is output, the dialing tone output is stopped for a predetermined period of time, so that an inquiry from a credit call company can be responded. For example, if NO in step T70 in FIG. 13, stop processing is performed to execute this processing.

After the auto-dialing operation is completed as described above, the switch K4 is operated to recover the normal data display mode. In this case, the operation of the switch K4 is detected in step T32, and the flow advances to step T36 via step T33 to determine that the credit call mode is set. In step T37, a mode number before the credit call mode is selected, which has been saved in the previous mode register N, i.e., "1" is set in the mode register M to recover the normal data display mode. The display state of the display unit 21 is returned to that in the normal data display mode, i.e., the display state C in FIG. 16.

When a credit call is to be made to a telephone number of a name displayed on the display unit 21, e.g., to Mr. "ICHIKAWA" at "0562(432)7633" shown in the display state G in FIG. 16 in the secret data display mode, the switch K4 is operated to set a credit call mode. The operation of the switch K4 is detected in step T32, and it is detected in step T33 that the secret mode (M="5") is set. In step T34, the value of the mode register M for designating a mode is temporarily saved in the previous mode register N. In step T35, data "7" is set in the mode register M to set the credit call mode. Therefore, in the display processing in FIG. 14, a company name designated by the pointer P3 at that time of the regular call data stored in the regular call data storage section CD and the telephone number of Mr. "ICHIKAWA" are displayed by the processing in step T94.

When a credit call is made by auto-dialing, the switch K6 is operated in the same manner as in the case wherein the credit call is performed to a telephone number stored in the normal data storage section ND. In this case, the same operation as for a credit call of normal data is performed. That is, in step T46 in FIG. 12, it is detected that the credit call mode is set. The dialing tone output processing in step T47, i.e., the flow chart in FIG. 13 is executed. More specifically, dialing tones of regular code data of the regular call data designated by the pointer P3 (regular code data associated with the company name displayed on the display unit 21) are output one by one in steps T65 to T72. When the character data "U" of the regular code data is read out, the telephone number of Mr. "ICHIKAWA" is output as dialing tones one by one. Thereafter, a portion after the character data "U" in the regular code data is output as dialing tones one by one.

When a credit call is made to a telephone number stored in the secret data storage section SD, as described above, the switch K3 is operated in the credit call mode set in steps T25, T26, T28, T30, and T31 in the same manner as in the case wherein a credit call is made to a telephone number stored in the normal data storage section ND, and a credit call service company can be designated from those preset in the regular code storage section CD.

As described above, after the auto-dialing operation to a telephone number stored in the secret data storage section SD is completed, the switch $K_4$ is operated to recover the secret data display mode. In this case, the operation of the switch $K_4$ is detected in step T32, and the flow advances to step T36 via step T33. In step T36, it is determined that the credit call mode is set. In step T37, a mode number before the credit call mode is selected, which has been saved in the previous mode register N, i.e., "5" is set in the mode register M to recover the secret data display mode. Thus, the display state of the display unit 21 is returned to that in the secret data display mode, i.e., the display state G in FIG. 16.

In the above embodiment, no description has been made for data setting in the normal data storage section ND, the secret data storage section SD, and the like. Data setting in these storage sections can be performed upon operations of the switches $K_4$ and $K_6$ in the same manner as in data setting for the regular call data storage section CD. More specifically, when the switch $K_5$ is operated for the first time in each mode, the code a is set, and data setting at a first digit is enabled. The switch $K_6$ is operated to sequentially set numerical values "0" to "9" or characters. Thereafter, the digits are sequentially selected by the switch $K_5$, and data setting is performed by the switch $K_6$. At a boundary between name data to telephone number data, when the switch $K_5$ is successively operated three times, this operation is detected and the code b is set. Thereafter, a telephone number can be set using the switches $K_5$ and $K_6$.

The present invention is not limited to the above embodiments, and various changes and modifications may be made.

For example, in the embodiments, a mode change from the normal data display mode (M="1") to the pass code input mode (M="4") is performed by the switch $K_2$. However, for example, if the switch $K_1$ is operated for a predetermined period of time in the timepiece mode (M="0"), M="1" may be set, and if the switch $K_1$ is kept ON for a predetermined period of time, M="4" may be set.

In the above embodiments, a credit call has been exemplified. For example, in the case of an international call, an international telephone identification number, a national number, and a special symbol are stored as a regular code, and can be subjected to autodialing together with a selected telephone number.

As described above, in the second embodiment, a regular code including a number and a special symbol to be added upon calling using a regular telephone number are stored independently of a plurality of telephone numbers. Upon calling, dialing tones are output while a telephone number is inserted in the special symbol portion in the regular code. Thus, an autodialing apparatus which can cope with a long telephone number for a credit call, an international call, or the like, and can efficiently utilize a storage section can be provided.

In the first and second embodiments, dialing tones from a speaker are sent onto a telephone line through a handset. However, the auto-dialing apparatus according to the present invention is assembled in a telephone set, so that a dialing signal can be sent to a telephone office directly through a telephone line.

The present invention is not limited to a credit call or an international call but is applicable to various other telephone call operations with a long telephone number. The present invention is limited to a wristwatch and telephone set but is applicable to various other devices, such as a radio telephone set, a compact electronic calculator, an IC card, an electronic memorandum, and the like.

What is claimed is:

1. An auto-dialing apparatus comprising:
    first telephone number data storage means for storing a plurality of normal telephone number data each including character data and telephone number data;
    display means for displaying said normal telephone number data stored in the first telephone number data storage means;
    pass code data storage means for storing pass code data;
    pass code data input means for inputting pass code data;
    coincidence detection means for detecting a coincidence between pass code data input by said pass code data input means and pass code data stored in said pass code data storage means;
    second telephone number data storage means for storing a plurality of first secret telephone number data each including character data and telephone number data, and for enabling said first secret telephone number data to be displayed on said display means only when said coincidence detection means detects a coincidence;
    third telephone number data storage means for enabling said second telephone number data to set and display only when said second telephone number data is displayed on said display means, and for storing said second secret telephone number data comprised of character data, symbol data and telephone number data;
    selection means for selecting one telephone number data among a plurality of normal telephone data stored in said first telephone number data storage means and a plurality of the first secret telephone number data stored in said second telephone number data storage means; and
    dialing tone output means for replacing the telephone number data selected by said selecting means with said symbol data of the second secret telephone number data stored in said third telephone number data storage means and converting the replaced telephone number data into a dialing tone signal, and for converting said telephone number data of said second secret telephone number data into a dialing tone signal, and continuously outputting the dialing tone signal.

2. An apparatus according to claim 1, wherein each of said first telephone number data storage means, said second telephone data storage means and said third telephone number data storage means comprises a RAM (random access memory), and wherein an operation of said dialing tone output means is executed in accordance with a program stored in a ROM (read-only memory).

3. An apparatus according to claim 1, further comprising external operation switch means for causing said dialing tone output means to output the dialing signal.

4. An apparatus according to claim 1, further comprising tone generation means for receiving said dialing tone signal from said dialing tone output means and for outputting a corresponding dialing tone.

5. An apparatus according to claim 1, housed in a wrist watch case.

6. An apparatus according to claim 1, wherein said third telephone number data storage means includes means for storing temporary stop symbol data for temporarily stopping the output of said dialing tone.

7. An apparatus according to claim 1, wherein said third telephone number data storage means includes means for storing a plurality of said second secret telephone numbers.

8. An apparatus according to claim 1, wherein said third telephone number data storage means includes:
   means for storing a plurality of said second secret telephone number data; and
   selection operation switch means for selecting one of a plurality of the second secret telephone number data.

9. An apparatus according to claim 1, further comprising operation switch means for causing said second secret number data stored in said third telephone number data to be displayed on said display means when the first secret telephone number data stored in said second telephone number data storage means is displayed on said display means.

10. An apparatus according to claim 1, wherein the character data stored in said third telephone number data storage means is displayed on said display means when the telephone number data is selected by said selection means.

11. An apparatus according to claim 1, wherein said third telephone number data storage means includes:
   means for storing a plurality of said second secret telephone number data; and
   second secret telephone number selection means is provided for selecting one of a plurality of said second secret telephone number data; and
   wherein said character data of the second secret telephone number selected by said second secret telephone number selection means is displayed on said display means when the telephone number data is selected by said selection means.

12. An apparatus according to claim 1, further comprising mode data storage means for identifying a first display mode wherein normal telephone number data stored in said first telephone number data storage means is displayed by said display device; a second display mode wherein the first secret telephone number data stored in said second telephone number data storage means is displayed by said display device; and a third display mode wherein the second secret telephone number data stored in said third telephone number data storage means is displayed by said display device.

* * * * *